(12) United States Patent
Zheng et al.

(10) Patent No.: US 9,048,926 B2
(45) Date of Patent: Jun. 2, 2015

(54) MULTI-CARD MOBILE TERMINAL AND SIM CARD DATA DUMPING METHOD THEREOF

(75) Inventors: Yu Zheng, Huizhou (CN); Yang Ding, Huizhou (CN)

(73) Assignee: HUIZHOU TCL MOBILE COMMUNICATION CO., LTD., Huizhou, Guangdong Province (CN)

( * ) Notice: Subject to any disclaimer, the term of this patent is extended or adjusted under 35 U.S.C. 154(b) by 135 days.

(21) Appl. No.: 13/979,651

(22) PCT Filed: Nov. 4, 2011

(86) PCT No.: PCT/CN2011/081777
§ 371 (c)(1),
(2), (4) Date: Jul. 13, 2013

(87) PCT Pub. No.: WO2012/126246
PCT Pub. Date: Sep. 27, 2012

(65) Prior Publication Data
US 2013/0295998 A1    Nov. 7, 2013

(30) Foreign Application Priority Data

Mar. 18, 2011  (CN) .......................... 2011 1 0066987

(51) Int. Cl.
| | | |
|---|---|---|
| *H04B 1/38* | (2006.01) | |
| *H04W 8/18* | (2009.01) | |
| *H04W 48/02* | (2009.01) | |
| *H04W 12/08* | (2009.01) | |
| *H04W 88/06* | (2009.01) | |

(52) U.S. Cl.
CPC ............. *H04B 1/3816* (2013.01); *H04W 8/183* (2013.01); *H04W 48/02* (2013.01); *H04W 12/08* (2013.01); *H04W 88/06* (2013.01)

(58) Field of Classification Search
CPC ....... H04W 12/06; H04W 12/08; H04W 8/18; H04W 8/20; H04W 48/18; H04W 24/02; H04W 52/0209; H04B 1/3816; H04L 63/0853
USPC ............... 455/558, 551, 422.1, 458; 370/389, 370/312, 355
See application file for complete search history.

(56) References Cited

U.S. PATENT DOCUMENTS

| | | | | |
|---|---|---|---|---|
| 5,907,804 | A | * 5/1999 | Schroderus et al. | .......... 455/411 |
| 2002/0058534 | A1 | * 5/2002 | Durand et al. | ................ 455/558 |
| 2002/0154632 | A1 | 10/2002 | Wang et al. | |

(Continued)

FOREIGN PATENT DOCUMENTS

| | | |
|---|---|---|
| CN | 1984409 A | 6/2007 |
| CN | 101039483 A | 9/2007 |

(Continued)

*Primary Examiner* — Kashif Siddiqui
*Assistant Examiner* — Minjung Kim
(74) *Attorney, Agent, or Firm* — Cheng-Ju Chiang

(57) ABSTRACT

The present disclosure discloses a multi-card mobile terminal and an SIM card data dumping method thereof An MCC and an MNC of a secondary SIM card is compared with data in a white list preset in the mobile terminal. If the secondary SIM card is to be locked, short message data is copied from the secondary SIM card, saved into a short message function module of the mobile terminal, labeled as being from the secondary SIM card and used by a primary SIM card. This helps a user to switch services from one operator to another without substantially affecting use of the mobile terminal, which represents conveniences for the user.

10 Claims, 2 Drawing Sheets

(56) References Cited

U.S. PATENT DOCUMENTS

| | | | |
|---|---|---|---|
| 2005/0153740 A1* | 7/2005 | Binzel et al. | 455/558 |
| 2006/0223582 A1* | 10/2006 | Simola | 455/558 |
| 2008/0051062 A1* | 2/2008 | Lee | 455/411 |
| 2009/0163175 A1* | 6/2009 | Shi et al. | 455/411 |
| 2009/0215490 A1* | 8/2009 | Lee et al. | 455/558 |
| 2010/0137029 A1* | 6/2010 | Kim | 455/558 |
| 2010/0311402 A1* | 12/2010 | Srinivasan et al. | 455/418 |
| 2010/0311444 A1* | 12/2010 | Shi et al. | 455/466 |
| 2013/0040618 A1* | 2/2013 | D'Amato et al. | 455/414.1 |
| 2013/0137484 A1* | 5/2013 | Torres | 455/558 |
| 2013/0237197 A1* | 9/2013 | Ruvalcaba et al. | 455/418 |
| 2014/0073375 A1* | 3/2014 | Li et al. | 455/558 |

FOREIGN PATENT DOCUMENTS

| | | |
|---|---|---|
| CN | 101409949 A | 4/2009 |
| CN | 101977263 A | 2/2011 |
| CN | 102137388 A | 7/2011 |
| CN | 102137389 A | 7/2011 |

* cited by examiner

MULTI-CARD MOBILE TERMINAL AND SIM CARD DATA DUMPING METHOD THEREOF

CROSS REFERENCE TO RELATED APPLICATIONS

The present application is a 35 U.S.C. §371 National Phase conversion of International (PCT) Patent Application No. PCT/CN2011/081777, filed on Nov. 4, 2011, the disclosure of which is incorporated by reference herein. The PCT International Patent Application was published in Chinese.

FIELD OF THE INVENTION

The present disclosure generally relates to the technical field of mobile terminals, and more particularly to a multi-card mobile terminal and an SIM (Subscriber Identity Module) card data dumping method thereof.

BACKGROUND OF THE INVENTION

As the mobile communication technologies advance and people's living standards improve continuously, use of various mobile terminals such as mobile phones becomes increasingly widespread.

Communication operators generally have an absolute control over mobile phones they purchased, and usually adopt the SIMLock technology to restrict users from using SIM cards of other operators in the mobile phones. As its name implies, SIMLock is used to restrict use of some SIM cards in a mobile terminal. Such restriction is done depending on needs of the operators, and is intended to protect their own rights and constrain their competitors by inhibiting use of SIM cards of other operators in the mobile terminals they issue.

Although the dual-card-dual-standby and multi-card-multi-standby technologies have appeared, there still lacks a thorough understanding by the operators on how to effectively utilize such technologies. Currently, practices of controlling functions within a mobile phone are all based on the SIMLock specification of the standard 3GPP/3GPP2 ($3^{rd}$ Generation Partnership Project 2), and all resources of a mobile phone are treated uniformly: either all functions are allowed to be used by the user or only an emergency call can be made.

On the other hand, in the mobile communication market dominated by the operators, it is difficult for a user who desires to change from one operator to another to keep the original telephone numbers, and this represents great inconveniences for the user.

Accordingly, improvements and developments still have to be made in the prior art.

SUMMARY OF THE INVENTION

A technical problem to be solved by the present disclosure is to provide a multi-card mobile terminal and an SIM card data dumping method thereof to overcome the aforesaid shortcomings of the prior art. The mobile terminal has an additional function: dumping out data of a secondary SIM card so that some of the data can be used by a primary SIM card when the secondary SIM card is locked out while the primary SIM card is not locked out. This represents conveniences for users.

Technical solutions adopted by the present disclosure are as follows.

An SIM card data dumping method for a multi-card mobile terminal, comprising the following steps of:

A. reading a Mobile Country Code (MCC) and a Mobile Network Code (MNC) from a primary SIM card;

B. detecting an SIMLock condition by comparing the MCC and the MNC of the primary SIM card with data in a white list preset in the mobile terminal to determine whether the primary SIM card is to be locked, wherein if the primary SIM card is to be locked, a general SIMLock process is executed and the process is terminated, and otherwise, the process proceeds to step C;

C. if the primary SIM card is not to be locked, then reading an MCC and an MNC from a secondary SIM card, and proceeding to step D;

D. detecting an SIMLock condition by comparing the MCC and the MNC of the secondary SIM card with the data in the white list preset in the mobile terminal to determine whether the secondary SIM card is to be locked, wherein if the secondary SIM card is to be locked, then the process proceeds to step E, and otherwise, the process is terminated directly;

E. prompting a user of whether to copy short message data from the secondary SIM card, wherein if the user chooses "no", the process is terminated, and otherwise, the process proceeds to step F; and F. reading short message data from the secondary SIM card piece by piece in sequence, and saving the short message data that is read into a short message function module of the mobile terminal and labeling the short message data as being from the secondary SIM card.

Preferably, the SIM card data dumping method for a multi-card mobile terminal further comprises the following step before the step A: a. presetting the white list of operators in the mobile terminal, the white list comprising an MCC and MNC's table that can be used in the mobile terminal and will not cause locking Preferably, the SIM card data dumping method for a multi-card mobile terminal further comprises the following steps after the step F:

G. checking, one by one in sequence, whether phone numbers of short message senders in the secondary SIM card are the same as phone numbers in a contact list of the primary SIM card and/or in a telephone directory of the mobile terminal, wherein if the answer is "yes", then the short message data reading of this time is completed directly, and otherwise, the process proceeds to step H; and H. prompting the user to save the phone numbers of short message senders in the secondary SIM card into the telephone directory of the mobile terminal.

Preferably, the SIM card data dumping method for a multi-card mobile further comprises the following step after the step H:

I. determining whether the short message data reading from the secondary SIM card has been completed, wherein if the answer is "no", the process returns to the step D, and otherwise, the process is terminated.

Preferably, in the SIM card data dumping method for a multi-card mobile terminal, reading short message data from the secondary SIM card piece by piece in sequence in the step F further comprises: reading basic short message files stored in the secondary SIM card piece by piece in sequence.

Preferably, in the SIM card data dumping method for a multi-card mobile terminal, checking, one by one in sequence, whether phone numbers of short message senders in the secondary SIM card are the same as phone numbers in a contact list of the primary SIM card and/or in a telephone directory of the mobile terminal in the step G comprises: checking whether an original address domain of data transmission from the basic short message files of the secondary SIM card is in the contact list of the primary SIM card and/or in the telephone directory of the mobile phone.

A multi-card mobile terminal comprising a primary SIM card and a secondary SIM card disposed therein, the multi-card mobile terminal further comprises:

a first reading module, being configured to read an MCC and an MNC from the primary SIM card;

a first detecting and determining module, being configured to detect an SIMLock condition by comparing the MCC and the MNC of the primary SIM card with data in a white list preset in the mobile terminal to determine whether the primary SIM card is to be locked;

a second reading module, being configured to read an MCC and an MNC from a secondary SIM card if the primary SIM card is not to be locked;

a second detecting and determining module, being configured to detect an SIMLock condition by comparing the MCC and the MNC of the secondary SIM card with the data in the white list preset in the mobile terminal to determine whether the secondary SIM card is to be locked;

a first prompting module, being configured to prompt a user of whether to copy short message data from the secondary SIM card; and a reading and storing module, being configured to read short message data from the secondary SIM card piece by piece in sequence, and save the short message data that is read into a short message function module of the mobile terminal and label the short message data as being from the secondary SIM card.

Preferably, the multi-card mobile terminal further comprises:

a setting module, being configured to preset the white list of operators in the mobile terminal, the white list comprising an MCC and MNC's table that can be used in the mobile terminal and will not cause locking Preferably, the multi-card mobile terminal further comprises:

a checking module, being configured to check, one by one in sequence, whether phone numbers of short message senders in the secondary SIM card are the same as phone numbers in a contact list of the primary SIM card and/or in a telephone directory of the mobile terminal; and a second prompting module, being configured to prompt the user to save the phone numbers of short message senders in the secondary SIM card into the telephone directory of the mobile terminal.

Preferably, the multi-card mobile terminal further comprises:

a data reading and determining module, being configured to determine whether the short message data reading from the secondary SIM card has been completed.

The multi-card mobile terminal and the SIM card data dumping method thereof according to the present disclosure allow data of a secondary SIM card to be dumped out so that some of the data can be used by a primary SIM card when the secondary SIM card is locked out while the primary SIM card is not locked out. By SIMLocking the secondary SIM card through use of the primary SIM card, short message data and short message sender data in the secondary SIM card are dumped to the mobile phone for use by the primary SIM card. This helps to meet needs of users and helps a user to switch services from one operator to another without substantially affecting use of the mobile terminal, which represents conveniences for the user.

DETAILED DESCRIPTION OF THE INVENTION

Figure 1:
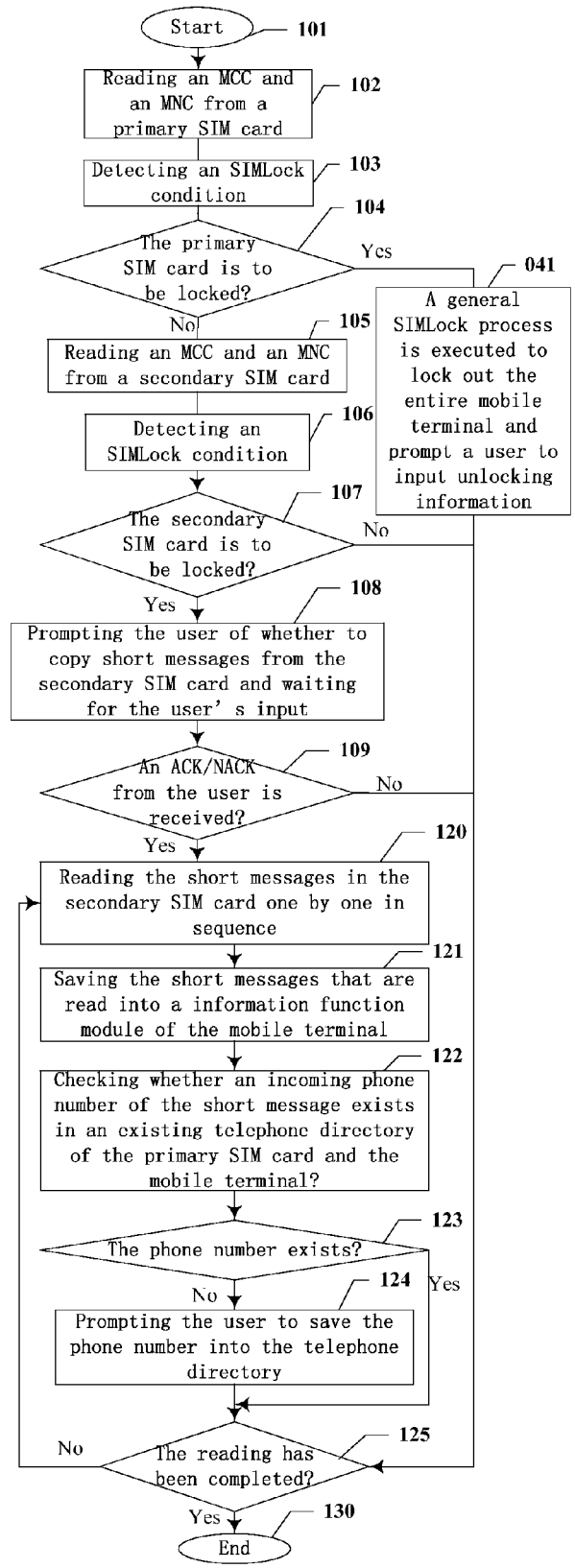
FIG. 1 is a flowchart diagram of an SIM card data dumping method for a multi-card mobile terminal according to an embodiment of the present disclosure.

The present disclosure provides a multi-card mobile terminal and an SIM card data dumping method thereof. Some technical terms used in embodiments of the present disclosure are explained as follows:

SIMLock: mobile network lock, called SIMLock for short in the present disclosure, being used to restrict a mobile communication apparatus from using a network of a specific operator;

MCC: Mobile Country Code, the MCC resource being allocated and managed uniformly by the International Telecommunication Union (ITU) to uniquely identify a country to which a mobile subscriber belongs, and an MCC code having three bits ("460" for China);

MNC: Mobile Network Code, having two bits and being used to identify a network to which the mobile subscriber belongs;

EF: Elementary File, an elementary file stored in an SIM card;

TP-DA: Transfer Layer Protocol-Destination Address, representing a destination address of data transmission; and TP-OA: Transfer Layer Protocol-Original Address, representing an original address of data transmission.

To make the objectives, technical solutions and advantages of the present disclosure clearer, the present disclosure will be further described hereinbelow with reference to the attached drawings and embodiments thereof. It shall be understood that, the embodiments described herein are only intended to illustrate but not to limit the present disclosure.

According to an embodiment of an SIM card data dumping method for a multi-card mobile terminal of the present disclosure, a white list of operators needs to be preset in the mobile terminal firstly. The white list comprises an MCC and MNC's table that can be used in the mobile terminal and will not cause locking In other words, the method of the present disclosure is implemented on the basis of presetting a white list of operators in the mobile terminal such as a mobile phone. The white list is typically a list of Mobile Country Codes (MCCs) and Mobile Network Codes (MNCs) recognized and specified by the operator. For SIM cards which are not listed in the white list, functions will be restricted: for example, dialing a phone number, sending a short message and connecting to the internet via GPRS are forbidden, or even the mobile phone is locked out directly.

In practical implementations, the method of the present disclosure needs to set the mobile terminal as follows.

1. Define a primary SIM card slot and a secondary SIM card slot in the multi-card mobile terminal. Only when an SIM card complying with the SIMLock condition is inserted in the primary SIM card slot, can the mobile terminal operate normally; and if no SIM card complying with the condition is inserted in the primary SIM card slot, the mobile terminal will be locked out even if an SIM card complying with the condition is inserted in the secondary SIM card slot.

2. Set the primary SIM card to be not locked out and the secondary SIM card to be locked out.

3. In the present disclosure, some functions of the SIM card which does not comply with the requirement are forbidden. However, when the present disclosure can be implemented, data (e.g., a telephone directory and short messages on the secondary SIM card) on the secondary SIM card can still be read by the lower layer of the system. It should be noted that, this is essentially different from the case where a user can read the SIM data.

As shown in FIG. 1, the SIM card data dumping method for a multi-card mobile terminal according to the embodiment of the present disclosure mainly comprises the following steps.

Step 101: start and proceed to step 102.

Step 102: read a Mobile Country Code (MCC) and a Mobile Network Code (MNC) from a primary SIM card, and then proceed to step 103. This operation of reading an MCC and an MNC from a primary SIM card is just a general operation of reading an SIM card data and, thus, will not be further described herein.

Step 103: detect an SIMLock condition by comparing the MCC and the MNC of the primary SIM card with data in a white list preset in the mobile terminal, i.e., by determining whether the MCC and the MNC of the primary SIM card is listed in the white list of an MCC and MNC's table of operators preset in the mobile terminal. An SIM card which is not listed in the white list will be locked out and its functions will be restricted: for example, dialing a phone number, sending a short message and connecting to the internet via GPRS are forbidden, or even the mobile phone is locked out directly. For an SIM card which is listed in the white list, a normal process is executed. Then the process proceeds to step 104.

Step 104: determine whether the primary SIM card is to be locked. If the primary SIM card is to be locked, the process proceeds to step 041; and otherwise, the process proceeds to step 105;

Step 041: execute a general SIMLock process by locking out the entire mobile terminal and prompting a user to input unlocking information. Then the process proceeds to step 130 where it is terminated.

Step 105: if the primary SIM card is not to be locked, read an MCC and an MNC from a secondary SIM card. Then the process proceeds to step 106.

Step 106: detect an SIMLock condition by comparing the MCC and the MNC of the secondary SIM card with the data in the white list preset in the mobile terminal, i.e., by determining whether the MCC and the MNC of the secondary SIM card is listed in the white list of an MCC and MNC's table of operators preset in the mobile terminal. An SIM card which is not listed in the white list will be locked out and its functions will be restricted: for example, dialing a phone number, sending a short message and connecting to the internet via GPRS are forbidden, or even the mobile phone is locked out directly. For an SIM card which is listed in the white list, a normal process is executed. Then the process proceeds to step 107.

Step 107: determine whether the secondary SIM card is to be locked. If the secondary SIM card is to be locked, then the process proceeds to step 108, and otherwise, the process proceeds to step 130 where it is terminated directly.

Step 108: prompt the user whether to copy short message data from the secondary SIM card, and wait for the user's acknowledgement (ACK)/non-acknowledgement (NACK) input. Then the process proceeds to step 109.

Step 109: detect whether the user's ACK/NACK input is received. If the user chooses not to copy the short message data from the secondary SIM card (i.e., chooses "no"), the process proceeds to step 130 where it is terminated; and otherwise, the process proceeds to step 120.

Step 120: read short message data from the secondary SIM card piece by piece in sequence, i.e., read basic short message files stored in the secondary SIM card one by one in sequence. For example, short message records (i.e., EFsms files) in the secondary SIM card are read one by one in sequence. "EF" means an elementary file, which is a kind of elementary file stored in the SIM card, and "SMS" means a short message. Then the process proceeds to step S121.

Step 121: save the short message data that is read into a short message function module of the mobile terminal and label the short message data as being from the secondary SIM card. Then the process proceeds to step 122.

Step 122: check, one by one in sequence, whether incoming phone numbers of the short messages exist in an existing telephone directory of the primary SIM card and the mobile terminal. Then the process proceeds to step 123.

Step 123: check one by one in sequence, whether the phone numbers of short message senders in the secondary SIM card exist in a contact list of the primary SIM card and/or the telephone directory of the mobile terminal. If the answer is yes, then the short message reading of this time is completed directly and the process proceeds to step 125; and otherwise, the process proceeds to step 124.

For example, it is checked whether the phone numbers of short message senders (i.e., TP-OA (original address) domains in the EFsms) exist in the contact list of the primary SIM card and/or the telephone directory of the mobile terminal. The "EFsms" is a kind of elementary short message file stored in the SIM card, and the "TP-OA (original address) domain" represents a transfer layer protocol-original address of data transmission.

Step 124: prompt the user to, if the phone numbers of short message senders in the secondary SIM card do not exist in the contact list of the primary SIM card and/or the telephone directory of the mobile terminal, save the phone numbers of short message senders in the secondary SIM card into the telephone directory of the mobile terminal. Subsequent operations (e.g., saving, modification, etc.) are executed correspondingly according to the user's choice, which will not be further described herein. Then the process proceeds to step 125.

Step S125: determine whether the short message data reading from the secondary SIM card has been completed. If the answer is "no", then the process returns to the step 120, and otherwise, the process proceeds to step 130.

Step 130: terminate the process.

According to the above descriptions, the SIM card data dumping method for a multi-card mobile terminal according to the embodiment of the present disclosure allows data of a secondary SIM card to be dumped out so that some of the data can be used by a primary SIM card when the secondary SIM card is locked out while the primary SIM card is not locked. This represents conveniences for users and helps to meet needs of users, helps an operator to compete for customers, and helps a user to switch services from one operator to another without substantially affecting use of the mobile terminal.

Figure 2:
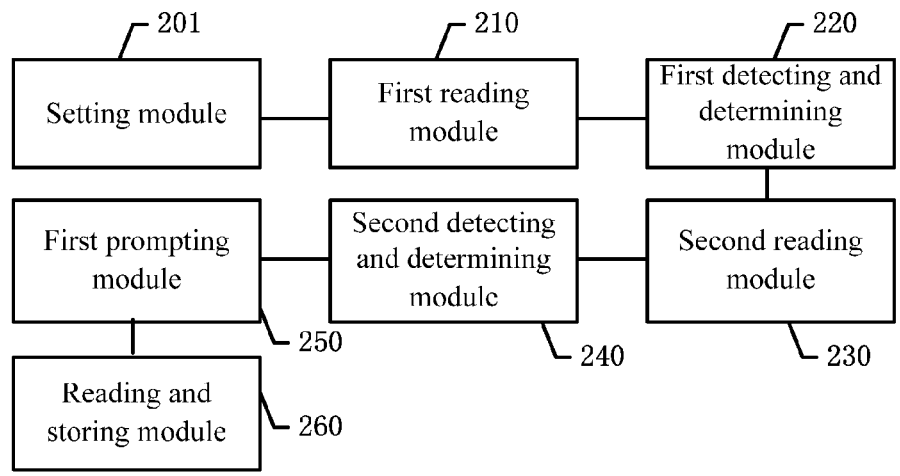
FIG. 2 is a functional block diagram of a multi-card mobile terminal according to a first embodiment of the present disclosure.

On the basis of the SIM card data dumping method for a multi-card mobile terminal according to the above embodiment, the present disclosure further provides a multi-card mobile terminal. The multi-card mobile terminal comprises a primary SIM card and a secondary SIM card disposed therein. As shown in FIG. 2, the multi-card mobile terminal according to a first embodiment further comprises:

a setting module 201, being configured to preset a white list of operators in the mobile terminal, the white list comprising an MCC and MNC's table that can be used in the mobile terminal and will not cause locking, as described above;

a first reading module 210, being configured to read an MCC and an MNC from a primary SIM card as described above;

a first detecting and determining module 220, being configured to detect an SIMLock condition by comparing the MCC and the MNC of the primary SIM card with data in the white list preset in the mobile terminal to determine whether the primary SIM card is to be locked as described above;

a second reading module 230, being configured to read an MCC and an MNC from a secondary SIM card when the primary SIM card is not to be locked as described above;

a second detecting and determining module 240, being configured to detect an SIMLock condition by comparing the MCC and the MNC of the secondary SIM card with the data in the white list preset in the mobile terminal to determine whether the secondary SIM card is to be locked as described above;

a first prompting module 250, being configured to prompt a user of whether to copy short message data from the secondary SIM card when the secondary SIM card is to be locked but the primary SIM card is not to be locked as described above; and a reading and storing module 260, being configured to read short message data from the secondary SIM card piece by piece in sequence, save the short message data that is read into a short message function module of the mobile terminal and label the short message data as being from the secondary SIM card as described above.

Figure 3:
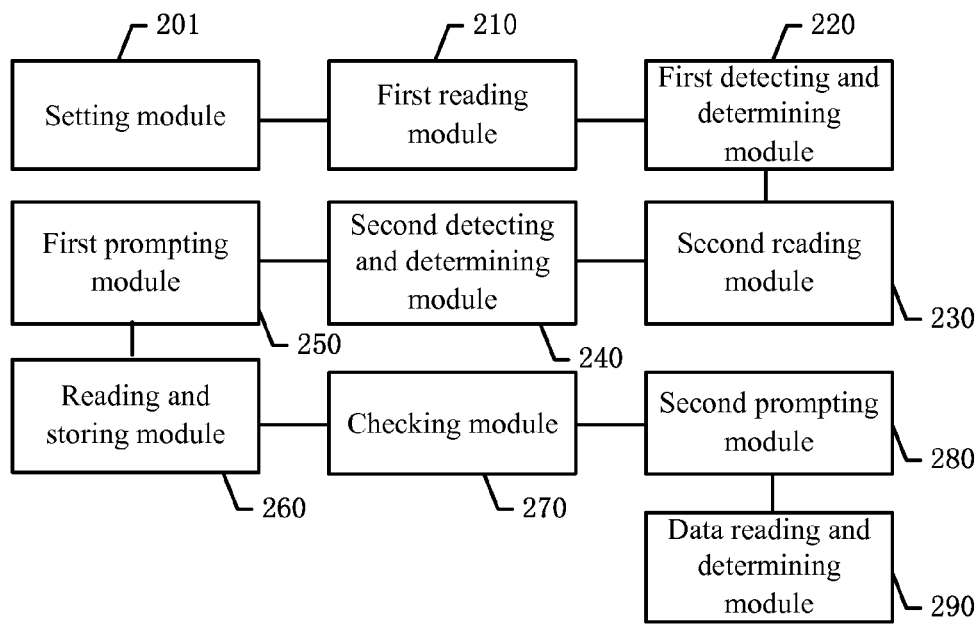
FIG. 3 is a functional block diagram of a multi-card mobile terminal according to a second embodiment of the present disclosure.

Further as shown in FIG. 3, in addition to the function modules of the first embodiment, a multi-card mobile terminal according to a second embodiment of the present disclosure further comprises:

a checking module 270, being configured to check, one by one in sequence, whether phone numbers of short message senders in the secondary SIM card are the same as phone numbers in a contact list of the primary SIM card and/or in a telephone directory of the mobile terminal as described above;

a second prompting module 280, being configured to prompt the user to save the phone numbers of short message senders in the secondary SIM card into the telephone directory of the mobile terminal as described above; and a data reading and determining module 290, being configured to determine whether the short message data reading from the secondary SIM card has been completed as described above.

The multi-card mobile terminal and the SIM card data dumping method thereof according to the present disclosure allow data of a secondary SIM card to be dumped out so that some of the data can be used by a primary SIM card when the secondary SIM card is locked out while the primary SIM card is not locked out. By SIMLocking the secondary SIM card through use of the primary SIM card, short message data and short message sender data in the secondary SIM card are dumped to the mobile phone for use by the primary SIM card. This helps to meet needs of users and helps a user to switch services from one operator to another without substantially affecting use of the mobile terminal, which represents conveniences for the user.

It shall be appreciated that, applications of the present disclosure are not limited to what exemplified above. Modifications or variations may be made by those of ordinary skill in the art according to the foregoing descriptions and all the modifications and variations shall be covered within the scope of the appended claims of the present disclosure.

What is claimed is:

1. An SIM (Subscriber Identity Module) card data dumping method for a multi-card mobile terminal, comprising the following steps of:

A. reading a Mobile Country Code (MCC) and a Mobile Network Code (MNC) from a primary SIM card;

B. detecting an SIMLock condition by comparing the MCC and the MNC of the primary SIM card with data in a white list preset in the mobile terminal to determine whether the primary SIM card is to be locked, wherein if the primary SIM card is to be locked, a general SIMLock process is executed, and otherwise, the process proceeds to step C;

C. if the primary SIM card is not to be locked, then reading an MCC and an MNC from a secondary SIM card, and proceeding to step D;

D. detecting an SIMLock condition by comparing the MCC and the MNC of the secondary SIM card with the data in the white list preset in the mobile terminal to determine whether the secondary SIM card is to be locked, wherein if the secondary SIM card is to be locked, then the process proceeds to step E, and otherwise, the process is terminated directly;

E. prompting a user of whether to copy short message data from the secondary SIM card, wherein if the user chooses "no", the process is terminated, and otherwise, the process proceeds to step F; and F. reading short message data from the secondary SIM card piece by piece in sequence, and saving the short message data that is read into a short message function module of the mobile terminal and labeling the short message data as being from the secondary SIM card.

2. The SIM card data dumping method for a multi-card mobile terminal of claim 1, further comprising the following step before the step A:

a. presetting the white list of operators in the mobile terminal, the white list comprising an MCC and MNC's table that can be used in the mobile terminal and will not cause locking.

3. The SIM card data dumping method for a multi-card mobile terminal of claim 1, further comprising the following steps after the step F:

G. checking, one by one in sequence, whether phone numbers of short message senders in the secondary SIM card are the same as phone numbers in a contact list of the primary SIM card and/or in a telephone directory of the mobile terminal, wherein if the answer is "yes", then the short message data reading of this time is completed directly, and otherwise, the process proceeds to step H; and H. prompting the user to save the phone numbers of short message senders in the secondary SIM card into the telephone directory of the mobile terminal.

4. The SIM card data dumping method for a multi-card mobile terminal of claim 3, further comprising the following step after the step H:

I. determining whether the short message data reading from the secondary SIM card has been completed, wherein if the answer is "no", the process returns to the step D, and otherwise, the process is terminated.

5. The SIM card data dumping method for a multi-card mobile terminal of claim 1, wherein reading short message data from the secondary SIM card piece by piece in sequence in the step F further comprises: reading basic short message files stored in the secondary SIM card piece by piece in sequence.

6. The SIM card data dumping method for a multi-card mobile terminal of claim 3, wherein checking, one by one in sequence, whether phone numbers of short message senders in the secondary SIM card are the same as phone numbers in a contact list of the primary SIM card and/or in a telephone directory of the mobile terminal in the step G comprises: checking whether an original address domain of data transmission from the basic short message files of the secondary SIM card is in the contact list of the primary SIM card and/or in the telephone directory of the mobile phone.

7. A multi-card mobile terminal comprising a primary SIM (Subscriber Identity Module) card and a secondary SIM card disposed therein, the multi-card mobile terminal further comprising:
- a first reading module, being configured to read an MCC (Mobile Country Code) and an MNC (Mobile Network Code) from the primary SIM card;
- a first detecting and determining module, being configured to detect an SIMLock condition by comparing the MCC and the MNC of the primary SIM card with data in a white list preset in the mobile terminal to determine whether the primary SIM card is to be locked;
- a second reading module, being configured to read an MCC and an MNC from a secondary SIM card if the primary SIM card is not to be locked;
- a second detecting and determining module, being configured to detect an SIMLock condition by comparing the MCC and the MNC of the secondary SIM card with the data in the white list preset in the mobile terminal to determine whether the secondary SIM card is to be locked;
- a first prompting module, being configured to prompt a user of whether to copy short message data from the secondary SIM card; and
- a reading and storing module, being configured to read short message data from the secondary SIM card piece by piece in sequence, and save the short message data that is read into a short message function module of the mobile terminal and label the short message data as being from the secondary SIM card.

8. The multi-card mobile terminal of claim 7, further comprising:
- a setting module, being configured to preset the white list of operators in the mobile terminal, the white list comprising an MCC and MNC's table that can be used in the mobile terminal and will not cause locking.

9. The multi-card mobile terminal of claim 8, further comprising:
- a checking module, being configured to check, one by one in sequence, whether phone numbers of short message senders in the secondary SIM card are the same as phone numbers in a contact list of the primary SIM card and/or in a telephone directory of the mobile terminal; and
- a second prompting module, being configured to prompt the user to save the phone numbers of short message senders in the secondary SIM card into the telephone directory of the mobile terminal.

10. The multi-card mobile terminal of claim 9, further comprising:
- a data reading and determining module, being configured to determine whether the short message data reading from the secondary SIM card has been completed.

* * * * *